US010089835B2

(12) United States Patent
Ward et al.

(10) Patent No.: US 10,089,835 B2
(45) Date of Patent: Oct. 2, 2018

(54) COMPACT POINT-OF-SALE SYSTEM

(71) Applicant: NCR Corporation, Duluth, GA (US)

(72) Inventors: William J. Ward, Cumming, GA (US); Peter B. Barron, Tucker, GA (US); Raymond W. Tadros, Alpharetta, GA (US); Joseph C. Fulton, Cumming, GA (US); Seng Chan, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/091,007

(22) Filed: Nov. 26, 2013

(65) Prior Publication Data

US 2015/0149311 A1 May 28, 2015

(51) Int. Cl.

| | |
|---|---|
| ***G06K 7/10*** | (2006.01) |
| ***G06F 12/00*** | (2006.01) |
| ***G06F 12/02*** | (2006.01) |
| ***G07G 1/00*** | (2006.01) |

(52) U.S. Cl.

CPC .................................. *G07G 1/0018* (2013.01)

(58) Field of Classification Search

CPC ....... G06Q 20/20; G06Q 20/202; G06Q 20/22

See application file for complete search history.

(56) References Cited

U.S. PATENT DOCUMENTS 4,304,385 A * 12/1981 Farouche ............... F16M 11/14 248/182.1
5,987,438 A * 11/1999 Nakano ................ G06K 7/0013 235/375
2006/0199714 A1* 9/2006 Yang ...................... F16M 11/10 482/148
2007/0241184 A1* 10/2007 Lum .................... G07G 1/0018 235/380
2012/0042116 A1* 2/2012 Park .................... G06F 13/4086 711/102

* cited by examiner

*Primary Examiner* — Talia F Crawley
(74) *Attorney, Agent, or Firm* — Schwegman, Lundberg & Woessner

(57) ABSTRACT

Various systems, methods, and apparatuses are described for facilitating a customer transaction via a point-of-sale terminal. One example system may comprise a point-of-sale terminal for facilitating a customer transaction. The system may further comprise a receipt printer for printing a receipt associated with the customer transaction. The printer may be built into the point-of-sale terminal. The point-of-sale terminal may be configured to be positioned on a substantially horizontal surface elevated above the ground. Similar and related methods, apparatuses, systems, and computer program products are also provided.

11 Claims, 7 Drawing Sheets

COMPACT POINT-OF-SALE SYSTEM

BACKGROUND OF THE INVENTION

The advancement of technology has broadened the capabilities of devices, creating opportunities for new and advanced solutions to common problems. Establishments, such as retailers and food service providers, want to provide fast, reliable service to their customers using the latest technologies. Even smaller businesses with fewer resources and less business certainty want to provide the same technologically enabled service to their customers. Today's systems, however, are often cost-prohibitive and generally require many separate components to function, such as monitors, computers, cash drawers, printers, and more. Aside from posing financial challenges to smaller businesses to get these technologies purchased and running, the systems often take up a large amount of space within the establishment. Many small businesses do not have enough real estate for such bulky, unwieldy systems, let alone for multiple stations.

Accordingly, it may be desirable to provide a low-cost, small footprint, point-of-sale system that avoids the above, and other, drawbacks associated with the current art.

BRIEF SUMMARY OF THE INVENTION

Various embodiments of the present invention provide systems, methods, apparatuses, and computer program products for facilitating a customer transaction via a point-of-sale terminal.

An example system may comprise a point-of-sale terminal for facilitating a customer transaction. The system may further comprise a receipt printer for printing a receipt associated with the customer transaction. The printer may be built into the point-of-sale terminal. The point-of-sale terminal may be configured to be positioned on a substantially horizontal surface elevated above the ground.

An example point-of-sale terminal for facilitating a customer transaction may comprise a display, a computer for operating point-of-sale software, a printer for printing a receipt related to the customer transaction, and a body configured to internally house the computer and the printer. The body may comprise a curved front face. The display may be mounted to the curved front face of the body for displaying at least one interface of the point-of-sale software to a user operating the point-of-sale terminal.

BRIEF DESCRIPTION OF THE DRAWINGS

Figure 1:
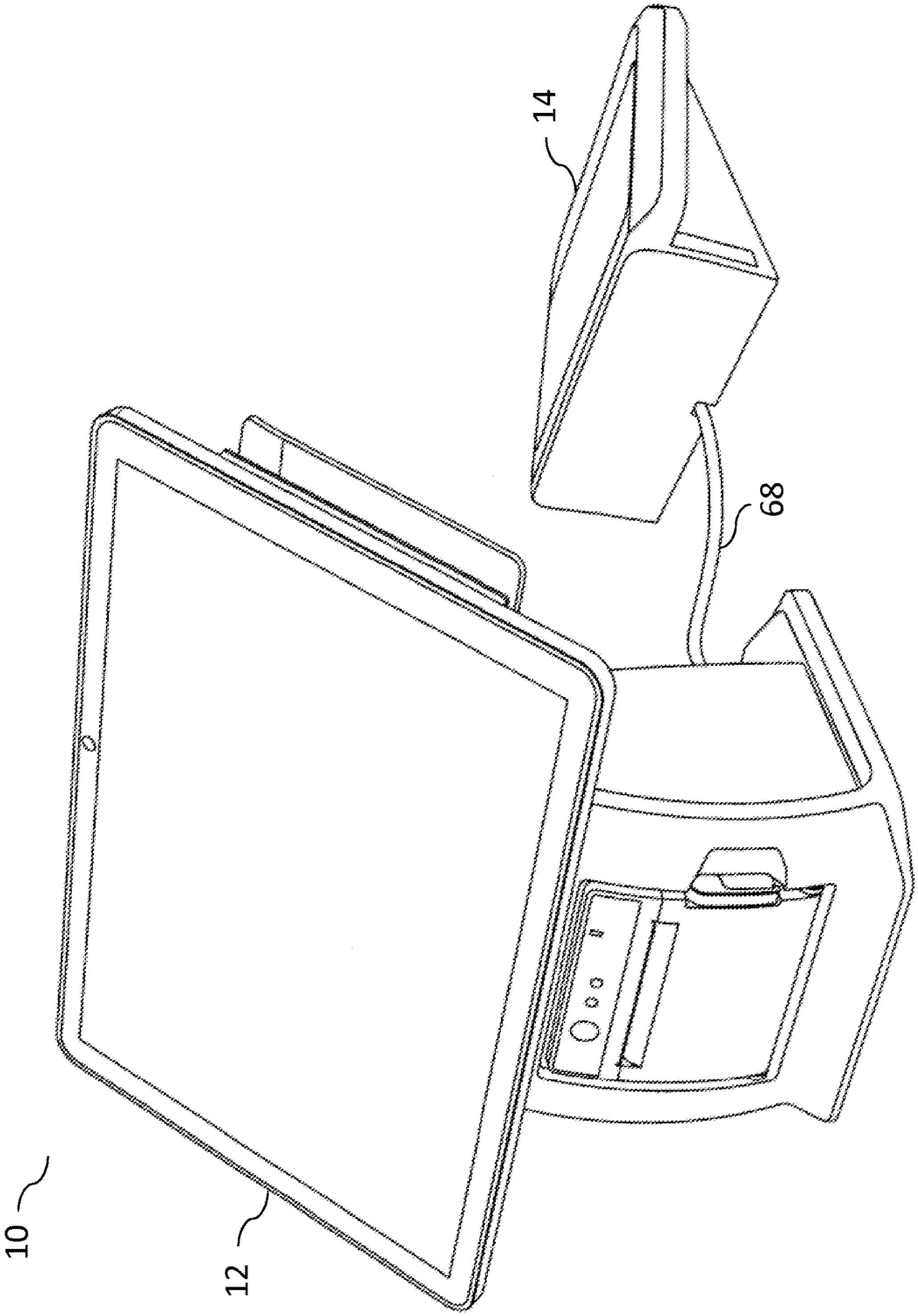

Having thus described the invention in general terms, reference will now be made to the accompanying drawings, which are not necessarily drawn to scale, and wherein:

FIG. 1 provides an illustration of a front perspective of one embodiment of a system that can be used to practice various aspects of the present invention.

Figure 2:
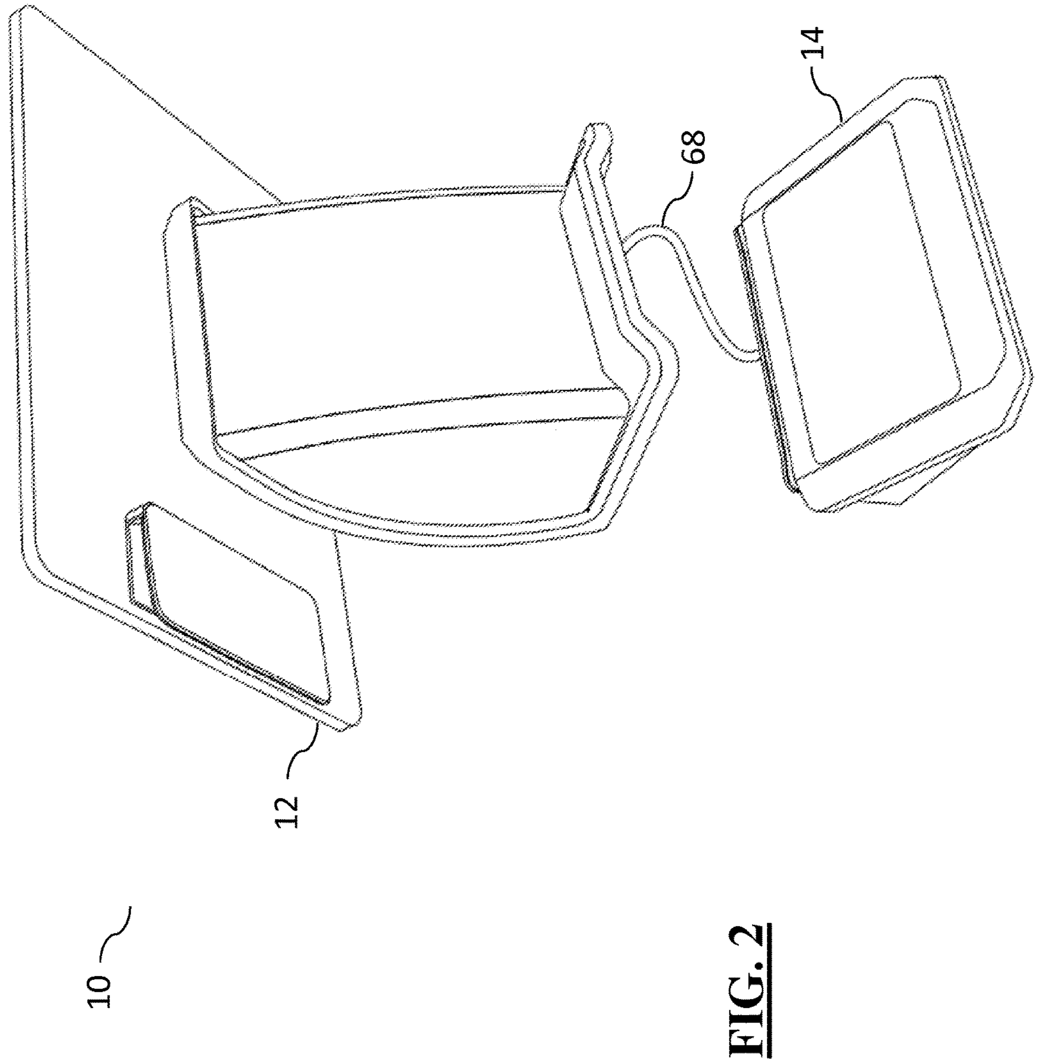

FIG. 2 provides an illustration of a rear perspective of one embodiment of a system that can be used to practice various aspects of the present invention.

Figure 3:
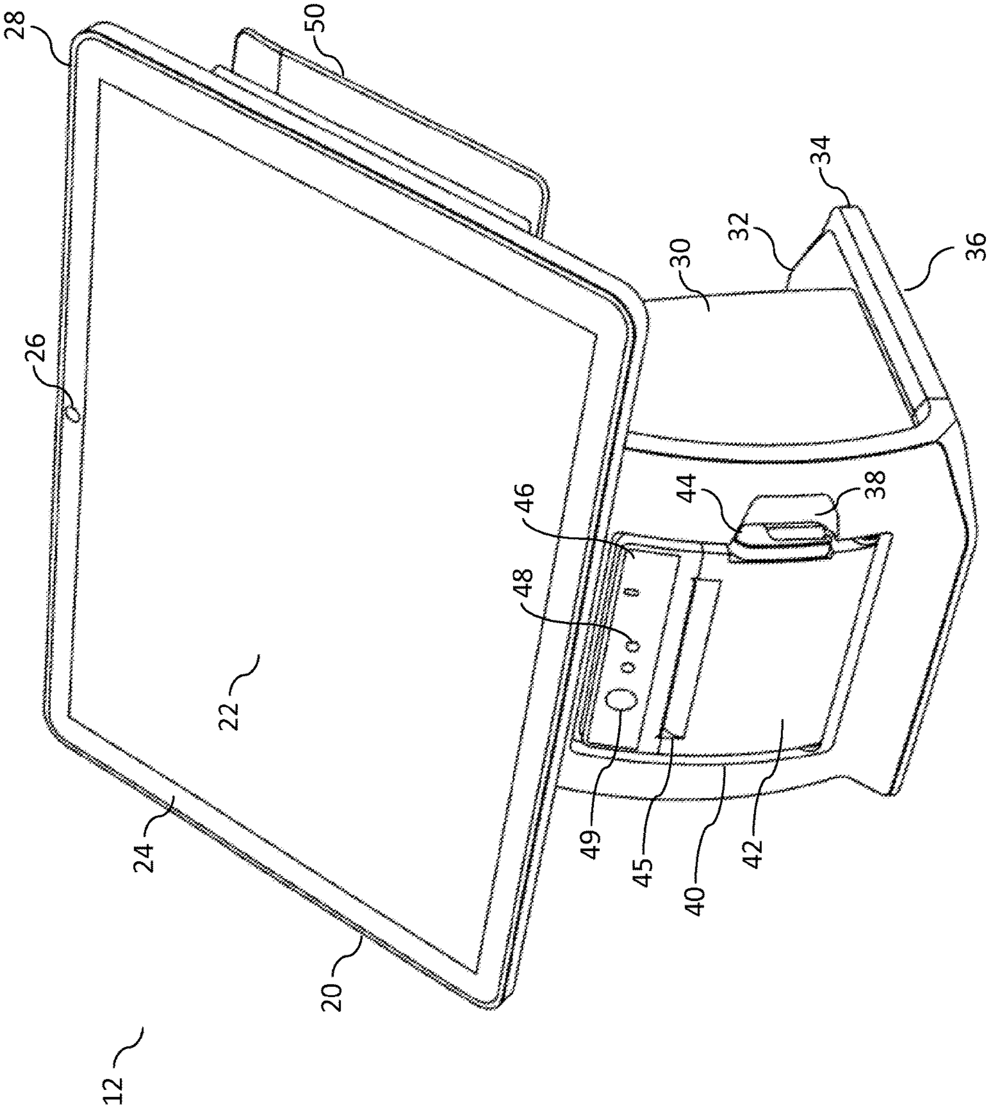

FIG. 3 provides an illustration of a front perspective of one embodiment of a point-of-sale terminal that can be used to practice various aspects of the present invention.

Figure 4:
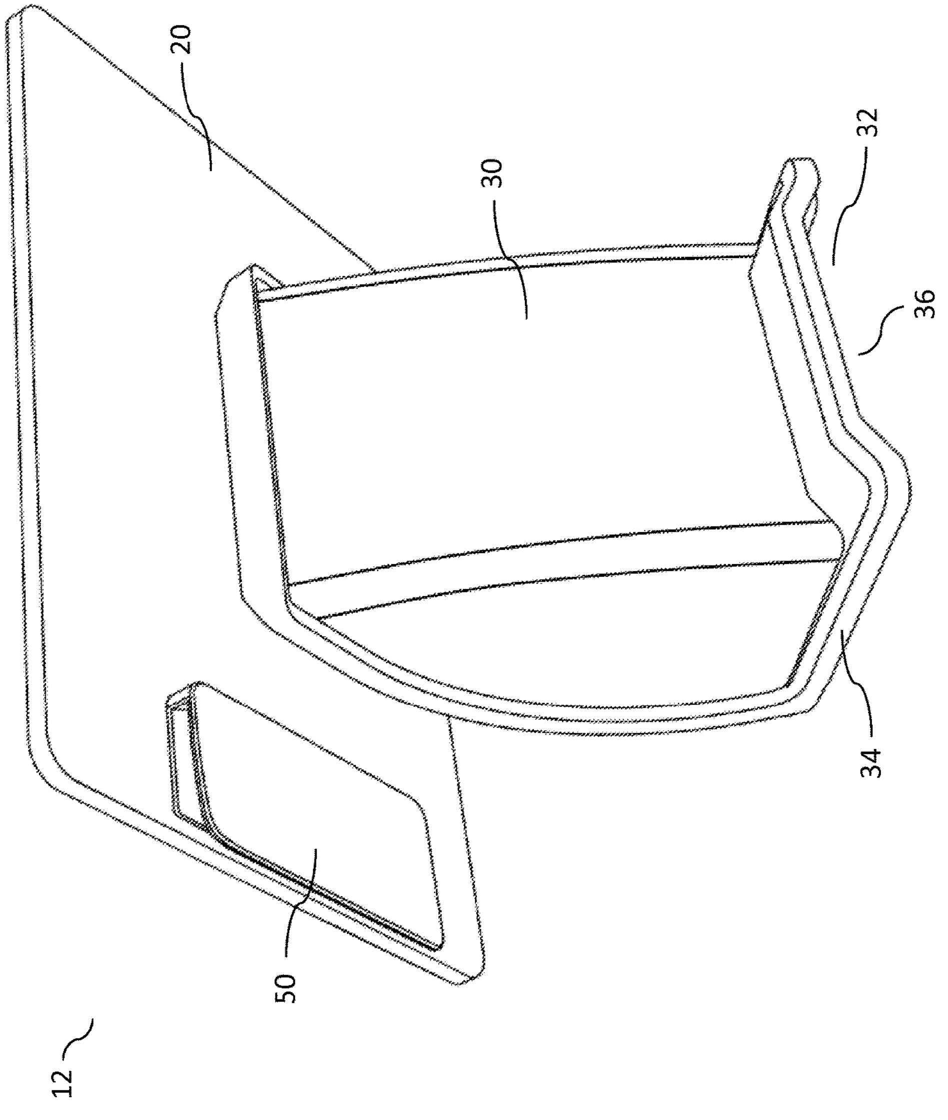

FIG. 4 provides an illustration of a rear perspective of one embodiment of a point-of-sale terminal that can be used to practice various aspects of the present invention.

Figure 5:
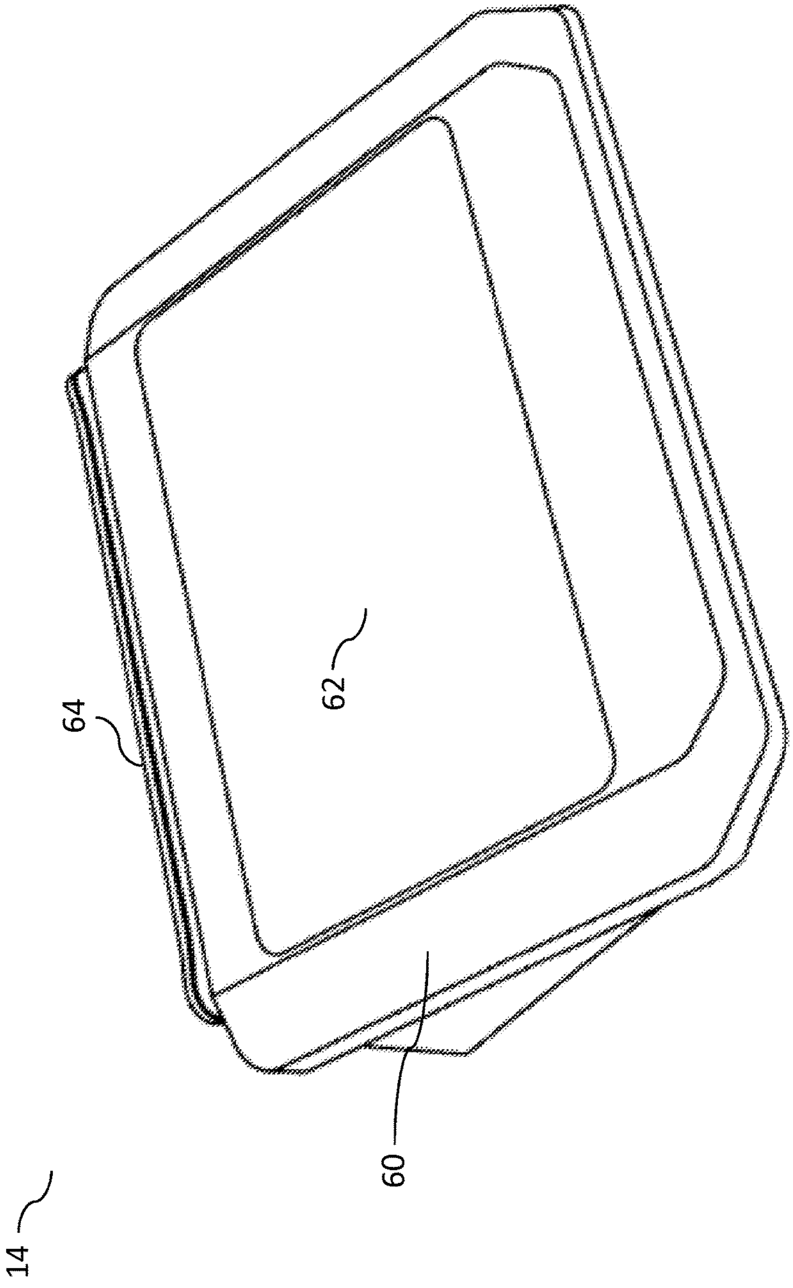

FIG. 5 provides an illustration of a front perspective of one embodiment of a customer display device that can be used to practice various aspects of the present invention.

Figure 6:
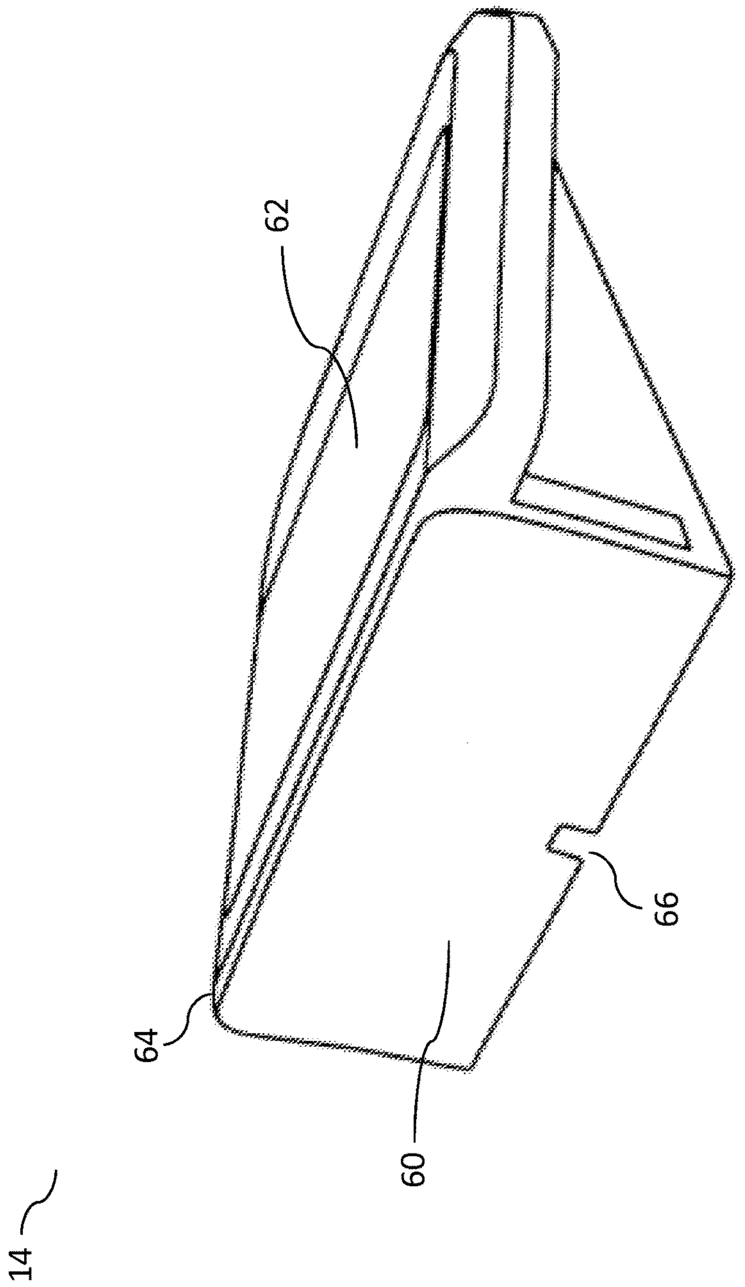

FIG. 6 provides an illustration of a rear perspective of one embodiment of a customer display device that can be used to practice various aspects of the present invention.

Figure 7:
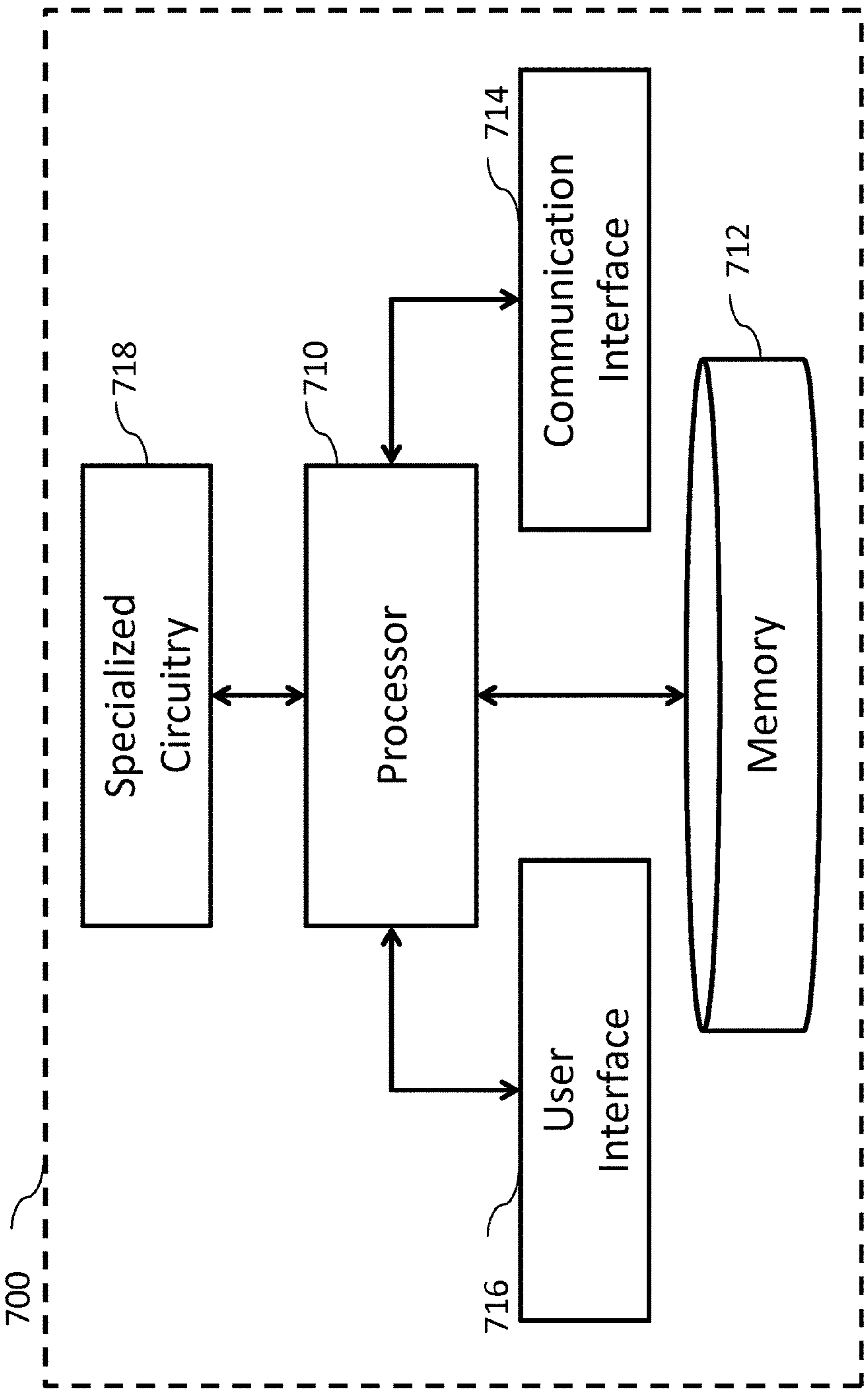

FIG. 7 provides a schematic diagram of a generic apparatus according to an embodiment of the present invention.

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

Various embodiments of the present invention provide for a point-of-sale system that is low-cost, multi-functional, and space-conserving. Some embodiments provide a single point-of-sale terminal comprising a computer, display, card reader, and built-in printer. Other embodiments further include a separate customer display device for providing transaction information to, and receiving payment for the transaction from, a customer.

FIGS. 1 and 2 provide an illustration of a system 10 according to various embodiments of the present invention. It should be noted that other system architectures are contemplated that may be used to practice various aspects of the invention. Thus, the system 10 provided in FIGS. 1 and 2 is for illustrative purposes only and should not be construed to limit the scope of the invention. Further, while FIGS. 1 and 2 illustrate certain system entities as separate, standalone entities, the various embodiments are not limited to this particular architecture.

An example system 10 may comprise a point-of-sale terminal 12 and, in certain instances, a customer display device 14. The point-of-sale terminal 12 may be in communication with the customer display device 14, for example via a wired or wireless connection.

In example embodiments, system 10 may comprise one or more additional peripheral components, such as a cash drawer, scanner (e.g., bar code scanner), external printer, currency and/or coin acceptor, or the like.

The point-of-sale terminal 12, as depicted in FIGS. 3 and 4, may comprise various components, such as a display 20, a body 30, a built-in printer 40, and/or a card reader 50. The point-of-sale terminal 12 may operate as an assisted-service and/or self-service terminal.

The display 20 may comprise a screen 22. The screen 22 may be a liquid crystal display or the like. In example embodiments, the screen 22 may comprise a touch screen (e.g., a capacitive touch screen). The screen 22 of the display 20 may be surrounded in part or in whole by a border 24. The screen may further be surrounded in part or in whole by a bezel 28. In some embodiments, the display may further comprise a camera 26 (e.g., a video camera, web camera, and/or the like) for capturing images and/or video.

As shown in FIGS. 3 and 4, the front face of the body 30 may be angled backwards, in some instances in a curved fashion. In example embodiments, the curvature of the front face of the body 30 may be such that the top of the front face contacts the top of the rear face of the body 30. In these embodiments, the front face of the body 30 may also serve as the top face, and the body 30 may not have a separate top face. The rear and side faces of the body 30 may be substantially vertical or, in certain embodiments, slightly angled or curved off vertical. The bottom face of the body 30 may be substantially flat and horizontal.

The bottom side of the body 30 may comprise one or more connection ports 36 (not visible in FIGS. 3 and 4) for connecting one or more cables. For example, the connection ports 36 may comprise power cable ports, universal serial bus (USB) ports, display ports, mini display ports, custom ports (e.g., combined power/display ports, touch display ports), and/or the like. The connection ports 36 may be hidden from view. For example, the connection ports 36 may be positioned under or on the bottom side of the body 30 or base 34 such that the connection ports 36 may not be seen. In these embodiments, only the cable 68 inserted into a connection port 36 may be viewed extending out of the aperture 32, but the connection port 36 itself may not be viewable.

The body 30 may further comprise a base 34 for supporting the body 30. The base 34 may extend horizontally beyond one or more edges (e.g., front, rear, sides) of the bottom of the body 30. The base 34 may be integral with the body or partially or completely separate. The rear of the base 34 may comprise an opening 32 to permit one or more cables to reach the connection ports 36 on the bottom side of the body 30. In this regard, the opening 32 may be formed such that one or more cables are permitted to exit from within or underneath the point-of-sale terminal 12 while the point-of-sale terminal 12 remains flat on a surface.

The body 30 may support the display 20. In this regard, the display 20 may be fixedly mounted to a portion of the body 30. For example, the display 20 may be mounted to a curved portion of the front face of the body 30. The display 20 may be mounted to the body 30 such that the display is angled forward and upwards. The angle that the display is mounted to the body 30 may be selected to permit a user of the point-of-sale terminal 12 to comfortably view the display 20. In some embodiments, the angle at which the display 20 is mounted to the body 30 may be adjustable in one or more directions (e.g., tilted or shifted up, down, left, right). In yet other embodiments, the display 20 may be detachably mounted to the body 30. In these embodiments, the body 30 may comprise a fixed, and in some instances adjustable, mount into which the display 20 may be attached and/or detached.

The body 30 may comprise a housing containing one or more internal components. For example, the body 30 may house a computer and associated components (e.g., processor, memory, and/or the like) for operating the point-of-sale terminal 12.

The body 30 may further comprise a built-in printer 40. In this regard, the body 30 may comprise an opening 38 for housing the built-in printer 40. In some instances, the opening 38 may further comprise a recessed portion to permit access to a latch 44 of the door 42 of the built-in printer 40. In various embodiments, the face of the built-in printer 40 may be flush with the front surface of the body 30 of the point-of-sale terminal 12.

The built-in printer 40 may comprise a door 42, a latch 44, a receipt port 45, and/or a panel 46 comprising one or more indicators 48 and/or buttons 49.

The door 42 may be transparent (e.g., clear), translucent, or opaque. The latch 44 may be used to open and close the door 44, for example to access a roll of receipt paper contained within.

The receipt port 45 may comprise an opening port where a printed receipt may be fed external to the built-in printer 40. In some instances, the receipt port 45 may comprise a cutting mechanism (e.g., a serrated blade) to facilitate tearing a protruding printed receipt from the roll of receipt paper.

The panel 46 may comprise one or more indicators 48 and/or buttons 49. The indicators 48 may provide a visual indication. For example, the indicator 48 may comprise a light emitting diode (LED) to provide a visual indication. The indicators 48 may indicate a status of the point-of-sale terminal 12 and/or the built-in printer 40, for example a power status and/or an error status. The buttons 49 may provide for controlling an aspect of the built-in printer 40. For example, the buttons 49 may comprise a feed button for initiating a feed of receipt paper through the receipt port 45.

The point-of-sale terminal 12 may comprise a card reader 50. In some embodiments, the card reader 50 may be mounted to the display 20. In other embodiments, the card reader 50 may be separate from the point-of-sale terminal 12. The card reader 50 may comprise a magnetic stripe reader, smart card reader, and/or the like.

As depicted in FIGS. 1 and 2, the system 10 may comprise a customer display device 14. The customer display device 14, as depicted in FIGS. 5 and 6, may comprise a housing 60, screen 62, a card reader 64, a cable opening 66, and/or a cable 68. In some embodiments, the customer display device 14 may comprise additional peripherals, such as a stylus.

The housing 60 of the customer display device 14 may contain one or more internal components. For example, the housing 60 may house a computer and associated components (e.g., processor, memory, and/or the like) for operating the customer display device 14. The housing may comprise a cable opening 66 or a receded portion for permitting a cable to exit from within or underneath the customer display device 14 while the customer display device 14 remains flat on a surface.

The screen 62 of the customer display device 14 may comprise a touch screen (e.g., a capacitive touch screen). The screen 62 of the customer display device 14 may be surrounded in part or in whole by a border. In some embodiments, the screen 62 may comprise a signature capture region.

The card reader 64 of the customer display device 14 may be mounted to the housing 60. For example, the card reader 64 may be mounted to a rear portion or top portion of the housing 60. In other embodiments, the card reader 64 may be an integral part of the housing 60. In yet other embodiments, the card reader 64 may be separate from the customer display device 14. The card reader 64 may comprise a magnetic stripe reader, smart card reader, and/or the like.

The point-of-sale terminal 12 may be configured for use at a retail, hospitality, financial, or other establishment or business location. In example embodiments, the point-of-sale terminal 12 may be conveniently positioned on a substantially horizontal surface, such as a tabletop or countertop, to permit an employee of the establishment to operate the point-of-sale terminal 12. In this regard, the point-of-sale terminal 12 may have a sufficiently small footprint to be positioned in such a location. The point-of-sale terminal 12 may be portable. In some instances, the point-of-sale terminal 12 may be positioned atop a cash drawer that itself is located on a table or counter top. The point-of-sale terminal 12 may be oriented towards the employee to facilitate interaction between the employee and the point-of-sale terminal 12.

The point-of-sale terminal 12 and/or customer display device 14 may be equipped with features to secure the devices to their position. For example, the point-of-sale terminal 12 and/or customer display device 14 may be equipped with internal or external magnets on the bottom of the device to secure the device to a substantially horizontal surface, such as a table top, counter top, stand, cash drawer, and/or the like.

One or more of the indicators 48 of the panel 46 may be configured to indicate when the point-of-sale terminal 12 is powered on or off.

During operation, the point-of-sale terminal 12 may be configured to execute and operate software. The software may include operating system software (e.g., Apple iOS®, Google Android™, Microsoft Windows®, and/or the like) as well as application software, such as point-of-sale software. In example embodiments, the computer and associated components (e.g., processor, memory, and/or the like) of the point-of-sale terminal 12 may be configured to operate and execute, as well as provide the functionality of, the software.

The point-of-sale terminal 12 may be configured to display the software and its associated interfaces on the screen 22. A user of the point-of-sale terminal 12 (e.g., an employee) may interact with and/or provide input to the software using the touch screen functionality of the screen 22. In some embodiments, the point-of-sale terminal 12 may receive additional input from a user via associated peripherals, such as a keyboard, mouse, touchpad, and/or the like.

The point-of-sale terminal 12 may permit a user to conduct a transaction for a customer, for example for the sale of one or more items or services. In this regard, the point-of-sale terminal 12 may be configured to receive input associated with the transaction from the user. In some embodiments, the point-of-sale terminal 12 may receive input from the user via the touch screen 22. The point-of-sale terminal 12 may receive input from the user via an external (e.g., peripheral) device, such as a bar code scanner connected to or in communication with the point-of-sale terminal 12.

After receiving input related to the transaction from the user, the point-of-sale terminal 12 may prepare for payment by a customer for the transaction. In this regard, the point-of-sale terminal 12 may be configured to accept payment for the transaction. For example, the card reader 50 of the point-of-sale terminal 12 may be configured to read different types of cards (e.g., debit cards, credit cards, gift cards, loyalty cards, and/or the like) to accept payment information of the customer for completing the transaction. The card reader 50 may obtain the customer payment information by reading a magnetic stripe of the card or communicating with the card via short range communication (e.g., via Bluetooth™, WiFi, near field communication (NFC), and/or the like). The card reader 50 may interact with the customer's card in a secure fashion.

In various embodiments, the point-of-sale terminal 12 may be configured to generate a receipt for the transaction. In this regard, the point-of-sale terminal 12 may execute software for generating the receipt information. In some embodiments, the point-of-sale terminal 12 may generate multiple receipts. For example, the point-of-sale terminal 12 may generate a first receipt to be signed by the customer and maintained by the user of the point-of-sale terminal 12, and a second receipt for the customer to keep for his or her records.

The built-in printer 40 of the point-of-sale terminal 12 may print the receipt information on receipt paper contained within the point-of-sale terminal 12. The printed receipt may be expelled from the point-of-sale terminal 12 via the receipt port 45 and torn from the receipt paper roll using the cutting mechanism of the built-in printer 40.

An indicator 48 on the panel 46 of the point-of-sale terminal 12 may provide an indication of the power status (e.g., on or off) of the built-in printer 40. In some instances, a button 49 on the panel 46 may provide for toggling the power of the built-in printer 40 on and/or off. In an instance in which the point-of-sale terminal 12 or built-in printer 40 detects an error, the point-of-sale terminal 12 may be configured to indicate the error via an indicator 48 on the panel 46. For example, the built-in printer 40 may detect that it has run out of receipt paper. In this instance, the user may use the latch 44 to open door 42 and replace the receipt paper. In example embodiments, the user may press a button 49 (e.g., a feed button) on the panel 46 to feed the receipt paper through the receipt port 45.

According to various embodiments, operation of the system 10 may be improved by the inclusion of a customer display device 14. The customer display device 14 may provide a customer the opportunity to interact with the system 10 and to monitor the transaction conducted by the user of the point-of-sale terminal 12 during operation. In this regard, the customer display device 14 may be oriented toward a customer to facilitate the customer's interactions and monitoring. For example, when a customer is facing the user of the point-of-sale terminal 12 (e.g., an employee), the customer display device 14 may be oriented approximately 180 degrees opposite the orientation of the point-of-sale terminal 12 along the horizontal axis, as depicted in FIGS. 1 and 2.

The screen 62 of the customer display device 14 may be configured to display information corresponding to or relating to the transaction conducted on the associated point-of-sale terminal 12. For example, the screen 62 may display the items or services being input into the point-of-sale terminal 12, the associated and summed prices, discounts, loyalty information, tax, and/or the like.

After input related to the transaction has been entered by the user of the point-of-sale terminal 12, the customer display device 14 may be configured to facilitate a customer paying for the transaction, inputting coupon and/or loyalty information, and/or the like. The customer display device 14 may permit a customer to select a method of payment, for example using a touch screen portion of the screen 62 or, in some instances, a stylus.

The card reader 62 of the customer display device 14 may be configured to read different types of cards (e.g., debit cards, credit cards, gift cards, loyalty cards, and/or the like) to accept payment information of the customer for completing the transaction. The card reader 62 may obtain the customer payment information by reading a magnetic stripe of the card or communicating with the card via short range communication (e.g., via Bluetooth™, WiFi, near field communication (NFC), and/or the like). The card reader 62 may interact with the customer's card in a secure fashion.

The screen 62 of the customer display device 14 may be configured to accept additional information from the customer related to the payment method. In some embodiments, the screen 62 may permit a customer to enter a personal identification number (PIN), zip code, and/or the like to confirm the customer's identity or authorization to use the method of payment provided. The screen 62 of the customer display device 14 may be further configured to accept a signature of the customer. Customer input may be received via a touch screen portion of the screen 62, or in some instances, via a stylus. In other embodiments, the customer signature may be received on a physical receipt at another time during the transaction.

The customer display device 14 may transmit customer input and/or receive transaction information to/from the point-of-sale terminal 12. In this regard, the point-of-sale terminal 12 and customer display device 14 may communicate via a connection between the two devices. For example, a cable 68 may connect the point-of-sale terminal 12 and the customer display device 14 to provide a communications channel. In another example, the point-of-sale terminal 12 and customer display device 14 may establish a wireless connection between each other to communicate.

In example embodiments, the connection between the point-of-sale terminal 12 and the customer display device 14 may provide power to the customer display device 14 from the point-of-sale terminal 12. Such capability may be in addition to the ability to transfer data over the connection, and in some instances both power and data may be carried over the same cable 68. The connection may permit the customer display device 14 to determine when to power on or off. For example, the customer display device 14 may be configured to use a power detector to determine when to power on or off. In some instances, a special sequence between the two devices may enable the customer display device 14 to determine when to power on or off.

Although the present invention has been described with particular reference to certain preferred embodiments thereof, variations and modifications of the present invention can be effected within the spirit and scope of the following claims.

Numerous benefits may be realized from the implementation of embodiments of the present invention. Various advantageous embodiments provide a low-cost point-of-sale system having a single, multi-functional terminal with a small footprint and requiring few to no additional peripheral devices to fully handle customer transactions. That is, a retailer may input a customer transaction, complete the transaction, receive payment from the customer for the transaction, and print a receipt for the customer using the same countertop terminal. In doing so, retailers may reduce the amount of space, cabling, and setup required for operating a point-of-sale system. In advantageous embodiments, any additional connections may be hidden from view providing a safer, less cluttered, and more aesthetically pleasing system. In other advantageous embodiments, the compact nature of the point-of-sale system may allow it to be positioned at, and easily moved around, many locations, such as on a counter top, table top, stand, cash drawer, shelf, or a small or confined location. Some advantageous embodiments may further include a customer display device for providing transaction information to, and receiving payment for the transaction from, a customer.

The operations of the methods described herein may be carried out in any suitable order, or simultaneously where appropriate. The methods described herein may be performed by software in machine readable form on a tangible storage medium or as a propagating signal.

In various embodiments, a point-of-sale terminal 12 and/or a customer display device 14 may be embodied as or otherwise include an apparatus 700 as generically represented by the block diagram of FIG. 7. In the example embodiment, the apparatus 700 may comprise various means for performing the various functions herein described. These means may comprise one or more of a processor 710, memory 712, communication interface 714, user interface 716, or specialized circuitry 718. The various means may be in communication with one another, such as via a bus.

The means of the apparatus 700 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 712) that is executable by a suitably configured processing device (e.g., the processor 710), or some combination thereof. In some example embodiments, the processor 710, memory 712, communication interface 714, user interface 716, and/or specialized circuitry 718 may be embodied as a chip or chip set.

The processor 710 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 7 as a single processor, in some embodiments the processor 710 may comprise a plurality of processors. The plurality of processors may be in operative communication with each other and may be collectively configured to perform one or more functionalities of the apparatus 700 as described herein. The plurality of processors may be embodied on a single device or distributed across a plurality of devices collectively configured to function as the apparatus 700.

In some example embodiments, the processor 710 may be configured to execute instructions stored in the memory 712 or memory otherwise accessible to the processor 710. These instructions, when executed by the processor 710, may cause the apparatus 700 to perform one or more of the functionalities of the apparatus 700 as described herein. Further, the processor 710 may comprise functionality to operate one or more software programs, which may be stored in memory. For example, the processor 710 may be capable of operating a connectivity program, such as a web browser. The connectivity program may allow the apparatus 700 to transmit and receive web content, such as location-based content, according to a protocol, such as Wireless Application Protocol (WAP), hypertext transfer protocol (HTTP), and/or the like. The apparatus 700 may be capable of using protocol(s), such as Transmission Control Protocol/Internet Protocol (TCP/IP), to transmit and receive web content across the internet or other networks.

The memory 712 may comprise, for example, volatile memory, non-volatile memory, or some combination thereof. In this regard, the memory 712 may comprise one or more tangible and/or non-transitory computer-readable storage media that may include volatile and/or non-volatile memory. Although illustrated in FIG. 7 as a single memory, the memory 712 may comprise a plurality of memories. The plurality of memories may be embodied on a single device or may be distributed across a plurality of devices collectively configured to function as the apparatus 700. In various example embodiments, the memory 712 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 712 may be configured to store information, data, applications (e.g., software programs), instructions, and/or the like, in some instances for execution by the processor 710, for enabling the apparatus 700 to carry out various functions in accordance with various example embodiments.

The communication interface 714 may be embodied as any device or means embodied in circuitry, hardware, a computer program product comprising computer readable program instructions stored on a computer readable medium (for example, the memory 712) and executed by a processing device (for example, the processor 710), or a combination thereof that is configured to receive and/or transmit data from/to another computing device. The communication interface 714 may include, for example, an antenna, a transmitter, a receiver, a transceiver, and/or supporting hardware or software for enabling communications with one or more remote devices. The communication interface 714 may be configured to receive and/or transmit data using any protocol that may be used for communications between devices.

The user interface 716 may be in communication with the processor 710 to receive an indication of a user input and/or to provide an audible, visual, mechanical, or other output to a user. As such, the user interface 716 may include, for example, a keyboard, keypad, scanner, printer, mouse, joystick, display (e.g., touch screen display), microphone, speaker, and/or other input/output mechanisms. The processor 710 and/or user interface circuitry comprising the processor 710 may be configured to control one or more functions of the user interface 716 through computer program instructions (e.g., software and/or firmware) stored on memory (e.g., memory 712) accessible to the processor 710.

The specialized circuitry 718 may be embodied as various means, such as circuitry, hardware, a computer program product comprising computer readable program instructions stored on a computer readable medium (for example, the memory 712) and executed by a processing device (for example, the processor 710), or some combination thereof and, in some embodiments, is embodied as or otherwise controlled by the processor 710.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A system comprising:

a point-of-sale terminal configured to facilitate a customer transaction;

a body housing the point-of-sale terminal and a receipt printer, the body further comprising an opening for housing the receipt printer, and the opening comprising a recessed portion to access a latch door for access to the receipt printer, and wherein a face of the receipt printer is flush with a surface of the body, wherein the body configured to house a first computer;

a base attached to the underside of the body including internal magnets to stabilize the POS terminal on top of a cash drawer;

the receipt printer configured to print a receipt associated with the customer transaction, and wherein the body further adapted to house within the body receipt paper, and the receipt printer adapted to print receipts from the receipt paper, wherein the printer including a cutting mechanism to cut from the receipt paper the receipt;

a customer display device, separate and remote from the point-of-sale terminal, configured to facilitate payment for the customer transaction by the customer and to wirelessly communicate with the point-of-sale terminal, and wherein the customer display device is configured to determine when to power on or off based on communications with the point-of-sale terminal, and wherein the customer display device includes: a customer display, a second computer, and a customer display card reader, and a second computer, and wherein the customer display card reader mounted on a top of the customer display;

the customer display card reader configured to read a customer provided card provided by the customer using the second computer with the customer display facing the customer during the customer transaction, wherein the customer display card reader is separate from a separate card reader of the point-of-sale terminal, and wherein the point-of-sale terminal operates as a customer assisted-service terminal during the customer transaction by executing software instructions on the first computer with the first computer configured to interface with the second computer during the customer transaction;

a separate display of the point-of-sale terminal configured to face a user/operator of the point-of-sale terminal during the transaction with the point-of-sale terminal operating as the customer assisted-service terminal, the separate display configured to be tilted or shifted up, down, left, and right, to a desired angle during the customer transaction;

the separate card reader configured to read a card when the point-of-sale terminal operates as a self-service terminal using the first computer, wherein the separate card reader mounted on the separate display;

wherein the point-of-sale terminal is configured to be positioned on a substantially horizontal surface and affixed to the cash drawer through the internal magnets of the base, wherein the point-of-sale terminal comprises at least one connection port, and wherein the at least one connection port is not visible when the point-of-sale terminal is positioned on the substantially horizontal surface;

wherein the point-of-sale terminal is portable.

2. A system comprising:

a point-of-sale terminal for facilitating a customer transaction;

a body housing the point-of-sale terminal, a first computer, and a receipt printer, the body further comprising an opening for housing the receipt printer, and the opening comprising a recessed portion to access a latch door for access to the receipt printer, and wherein a face of the receipt printer is flush with a surface of the body;

a base attached to the underside of the body including internal magnets to stabilize the POS terminal on top of a cash drawer;

the receipt printer for printing a receipt associated with the customer transaction, and wherein the body further adapted to house within the body receipt paper, and the receipt printer adapted to print receipts from the receipt paper, wherein the receipt printer includes a cutting mechanism to cut from the receipt paper the receipt;

a display configured to face a user/operator of the point-of-sale terminal during the transaction with the point-of-sale terminal operating as a customer assisted-service terminal using software instructions executing on the first computer, wherein the display configured to be tilted or shifted up, down, left, and right, to a desired angle during the customer transaction;

a card reader configured to read a card when the point-of-sale terminal operates as a self-service terminal using the software instructions executing on the first computer, wherein the card reader mounted on the display;

a separate customer display device that is separate from the body and the display, wherein the separate customer display device comprising: a second computer, a customer display, and a separate customer display card reader;

the separate customer display card reader configured to read a customer provided card provided by the customer using the second computer with the customer display facing the customer during the customer transaction, wherein the separate customer display card reader is separate from the card reader of the point-of-sale terminal, and wherein the point-of-sale terminal operates as the customer assisted-service terminal during the customer transaction using the first computer and the second computer, and wherein the separate customer display reader is mounted on a top of the customer display;

wherein the point-of-sale terminal is configured to be positioned on a substantially horizontal surface of the cash drawer and affixed to the cash drawer by the internal magnets of the base; and and wherein the cash drawer is in communication with the first computer of the point-of-sale terminal, wherein the point-of-sale terminal comprises at least one connection port, and wherein the at least one connection port is not visible when the point-of-sale terminal is positioned on the substantially horizontal surface of the cash drawer, and wherein the point-of-sale terminal comprises an aperture where a cable connected to the at least one connection port may extend from beneath the point-of-sale terminal when the point-of-sale terminal is positioned on the substantially horizontal surface of the cash drawer and the cable connectable to a customer display device port for interfacing the first computer of the point-of-sale terminal to the second computer of the separate customer display device during transaction processing on the point-of-sale terminal;

wherein the point-of-sale terminal is portable.

3. The system of claim 1, wherein the separate customer display device receives power from the point-of-sale terminal.

4. A point-of-sale terminal for facilitating a customer transaction, comprising:

a display configured to face a user/operator during the customer transaction when the point-of-sale terminal operates as a customer assisted terminal for the customer transaction, wherein the display further configured to be tilted or shifted up, down, left, and right, to a desired angle during the customer transaction;

a first computer for operating point-of-sale software;

a printer for printing a receipt related to the customer transaction;

a body configured to internally house the first computer and the printer, wherein the printer the body further comprising an opening for housing the printer, and the opening comprising a recessed portion to access a latch door for access to the printer, and wherein a face of the printer is flush with a front surface body of the point-of-sale terminal, and wherein the body further adapted to house within the body receipt paper, and the printer adapted to print receipts from the receipt paper, wherein the receipt printer includes a cutting mechanism to cut from the receipt paper the receipts;

a card reader mounted on the display configured for reading a card using the first computer when the first computer executes software instructions that operates the point-of-sale terminal as a self-service terminal;

a customer display device that is separate from the body and the display, wherein the customer display device comprises: a second computer, a customer display, and a customer display card reader, wherein the customer display card reader mounted to a top of the customer display;

the customer display card reader configured to read a customer provided card provided by the customer using the second computer with the customer display device facing the customer during the customer transaction, wherein the point-of-sale terminal operates as the customer assisted-service terminal during the customer transaction through interaction of the first computer and the second computer;

wherein the body comprises a curved front face; and wherein the display is mounted to the curved front face of the body for displaying at least one interface of the point-of-sale software to a user operating the point-of-sale terminal, wherein the point-of-sale terminal comprises at least one connection port, and wherein the at least one connection port is not visible when the point-of-sale terminal is positioned on the substantially horizontal surface, and wherein the point-of-sale terminal comprises an aperture where a cable connected to the at least one connection port may extend from beneath the point-of-sale terminal when the point-of-sale terminal is positioned on the substantially horizontal surface and the cable connectable to a customer display device port for interfacing the point-of-sale terminal to the customer display device through interaction between the first computer and the second computer;

wherein the point-of-sale device is portable.

5. The point-of-sale terminal of claim 4 further comprising at least one connection port, and wherein the at least one connection port is not visible when the point-of-sale terminal is positioned on a substantially horizontal surface.

6. The point-of-sale terminal of claim 4, wherein the point-of-sale terminal is configured to be positioned on a surface selected from the group consisting of a table top, a counter top, a shelf, and a cash drawer.

7. The point-of-sale terminal of claim 6, wherein the surface is a top surface of the cash drawer; and wherein the cash drawer is in communication with the first computer of the point-of-sale terminal.

8. The point-of-sale terminal of claim 4, wherein the display is detachably mounted to the body of the point-of-sale terminal.

9. The point-of-sale terminal of claim 4, wherein the point-of-sale terminal is configured to facilitate the customer transaction without additional peripherals.

10. The system of claim 1, wherein the customer display device is configured to use a power detector to determine when to power on or off.

11. The system of claim 1, wherein the customer display device is configured to use a particular communication sequence between the second computer of the customer display device and the first computer of the point-of-sale terminal to determine when to power on or off.

* * * * *